APPARATUS FOR AIR CONDITIONING SYSTEMS

Original Filed Sept. 15, 1969 4 Sheets-Sheet 1

INVENTOR
GENE W. OSHEROFF
BY Allen E. Botney
ATTORNEY

APPARATUS FOR AIR CONDITIONING SYSTEMS

Original Filed Sept. 15, 1969 4 Sheets-Sheet 2

INVENTOR
GENE W. OSHEROFF
BY Allen E. Bohnen
ATTORNEY

APPARATUS FOR AIR CONDITIONING SYSTEMS

Original Filed Sept. 15, 1969 4 Sheets-Sheet 3

INVENTOR
GENE W. OSHEROFF
BY Allen Z. Bothney
ATTORNEY

APPARATUS FOR AIR CONDITIONING SYSTEMS

Original Filed Sept. 15, 1969 4 Sheets-Sheet 4

INVENTOR
GENE W. OSHEROFF
BY Allen E. Bothney
ATTORNEY

United States Patent Office

Re. 27,907
Reissued Jan. 29, 1974

27,907

APPARATUS FOR AIR-CONDITIONING SYSTEMS

Gene W. Osheroff, Las Vegas, Nev., assignor to Fluidtech Corporation, Inglewood, Calif.

Original No. 3,563,306, dated Feb. 16, 1971, Ser. No. 864,931, Sept. 15, 1969, which is a continuation-in-part of abandoned Ser. No. 801,930, Feb. 20, 1969, which in turn is a continuation-in-part of abandoned Ser. No. 640,578, May 23, 1967. Application for reissue Oct. 27, 1972, Ser. No. 301,599

Int. Cl. F24f *3/00*

U.S. Cl. 165—22 12 Claims

Matter enclosed in heavy brackets [ ] appears in the original patent but forms no part of this reissue specification; matter printed in italics indicates the additions made by reissue.

ABSTRACT OF THE DISCLOSURE

The present invention concerns the application of fluidic devices to air-conditioning systems. More specifically, the present invention encompasses the use of fluidic valves by means of which heating and cooling can be controlled without moving parts being involved. Through the use of such devices, throttling as a means for controlling flow is eliminated altogether and the control of multi-zone air conditioning is rendered more feasible.

This application for patent is a continuation-in-part *application* of the [earlier continuation-in-part] application filed Feb. 20, 1969, [and] having Ser. No. 801,930 [, now abandoned]. Accordingly, [said prior] application *Ser. No. 801,930* is abandoned with the filing herewith of this continuation-in-part. *In turn, application Ser. No. 801,930 is a continuation-in-part application of the application filed May 23, 1967, and having Ser. No. 640,578, also now abandoned.*

The present invention relates in general to air-conditioning systems and more particularly relates to apparatus for the improvement of air-condtiioning systems.

As is well known, in air-conditioning systems of the kind used in hotels, motels, office buildings, and the like, throttling is the means by which the flow of hot or cold air to any one room or zone is controlled. By throttling is meant that the quantity of air flowing in the supply duct is varied as thermostatically controlled dampers open and close. Unfortunately, however, this throttling of the airflow to the conditioned space produces a pressure imbalance in the system which makes suitable temperature control impossible without employing some form of complicated and relatively expensive apparatus for constant volume control at the fans or discharge terminals. The present invention is intended to and does alleviate this problem.

More particularly, the present invention eliminates throttling altogether and this is achieved by means of a bypass valve whose operation is based on fluidic principles. More specifically, instead of throttling, the bypass valve, under the control of the room or zone thermostat, simply diverts the air to the return sysem, thereby providing substantially constant room or zone control. Thus, whereas in prior art systems the quantity of air flowing in the supply duct varies as thermostatic dampers open and close, in any arrangement according to the present invention once the system is balanced it will thereafter deliver a substantially constant airflow at the register on call from the thermostat.

Moreover, as is well known by those skilled in the art, fluidic devices do not require and usually do not include any moving parts or members, with the result that their use in air-conditioning systems makes still other improvements possible in addition to that already mentioned. Thus, for example, these fluidic devices can be adapted so that hot and cold coils can be mounted in their output channels or ports, which, in turn, means that hot and cold coils for respectively heating or cooling the air can now feasibly be mounted in the duct leading to each room or zone, thereby making multizone control of this kind entirely feasible. Needless to say, the same basic principles also allow for other forms of multizone control.

It is, therefore, an object of the present invention to provide an air-conditioning system in which throttling is not used to control the air flow therein.

It is an additional object of the present invention to provide an air-conditioning system in which the conditioned air either flows ito the zone to be conditioned or bypassed directly to the return duct.

It is another object of the present invention to provide fluidic apparatus in air-conditioning systems to maintain substantially balanced pressures in the system.

It is still another object of the present invention to provide an air-conditioning in which the supply duct handles the same volume of air whether air is being delivered to the conditioned space or the return duct.

It is a further object of the present invention to provide an air-conditioning system in which fluidic bypass valves are used to channel, route or control the flow of the air therein, and the heating or cooling thereof.

The novel features which are believed to be characteristic of the invention, both as to its organization and method of operation, together with further objects and advantages thereof, will be better understood from the following description considered in connection with the accompanying drawings in which an embodiment of the invention and several modifications thereof are illustrated by way of example. It is to be expressly understood, however, that the drawings are for the purpose of illustration and description only and are not intended as a definition of the limits of the invention.

Figure 1:
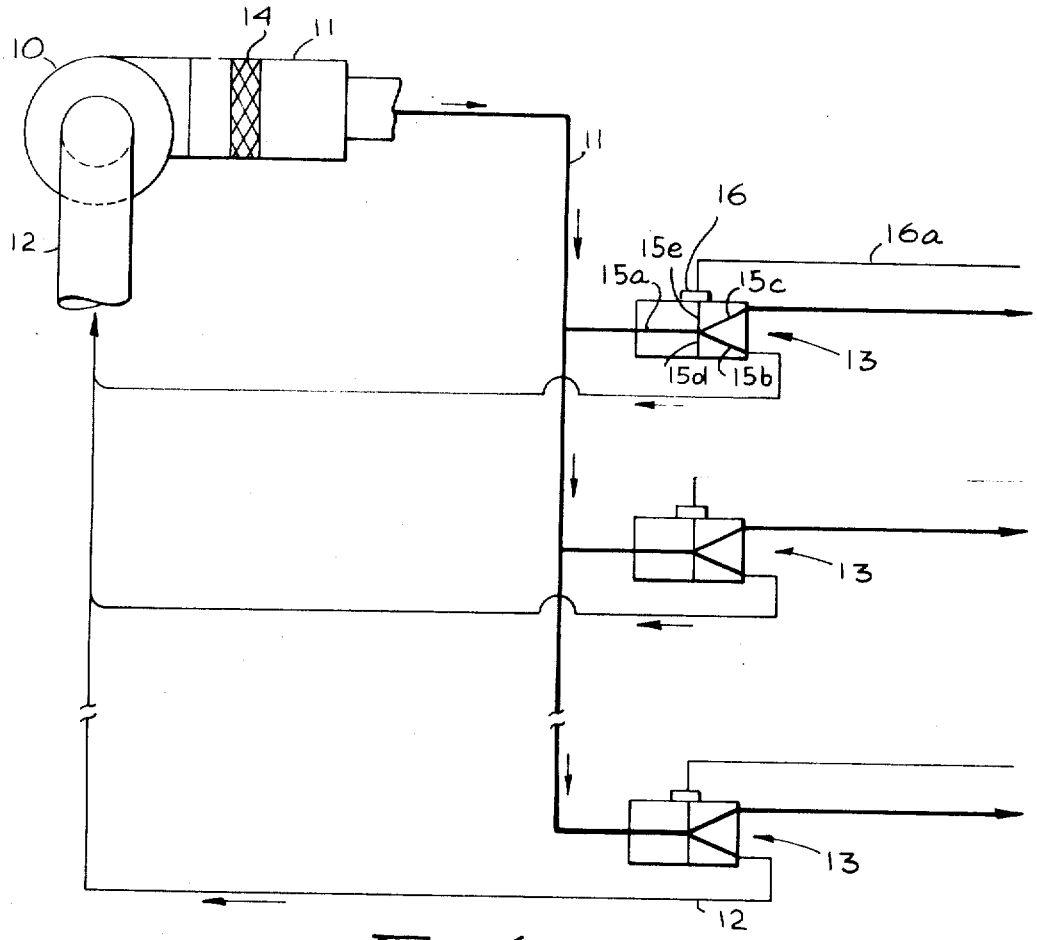
FIG. 1 is a schematic diagram illustrating an air-conditioning system by means of which the details of the present invention can be explained, the fluidic valve shown in this diagram being of the monostable type.

For a consideration of the invention in detail, reference is now made to the drawings wherein like or similar parts or elements are given like or similar designations throughout the several figures. Referring first to the air-conditioning system schematically presented in FIG. 1, it is shown to basically include a system fan 10 that provides air under pressure to the system, a supply duct 11 by means of which air supplied by the fan is directed to the proximity of rooms or zones to be conditioned, a return duct 12 by means of which the air leaving the conditioned room or zones are returned to the fan for recirculation, and a bypass valve arrangement, generally designated 13, located close to each room or zone for selectively directing air from the supply duct either to the associated room or zone or back to the return duct. Finally, as shown in the figure, the system necessarily includes apparatus 14 by means of which the air entering the supply duct is either heated or cooled deepnding on whether the system is a heating or cooling system.

Considering bypass valve arrangement 13 more fully, the valve therein may be either of the monostable or bistable type and one such arrangement is provided for each room or zone to be air-conditioned. More particularly, the bypass valve in each arrangement 13 is a fluid amplifier device that may be either of the monostable or bistable type, and one such fluid amplifier device is provided per room or zone. For sake of clarity and to facilitate an understanding of the invention, air-conditioning systems employing both types of fluid amplifier devices will be described, first including the monostable type and later with the bistable type. However, it must be emphasized that either type of device is applicable. Accordingly, with this in mind, reference is once again made to FIG. 1 wherein each arrangement 13 is shown to include a fluid amplifier device 15 of the monostable kind as well as a thermostatically controlled solenoid 16 that is mounted on the fluid amplifier device itself. A monostable type of fluid amplifier device is shown and described in Report No. 9 of the Fluid Amplification Series periodically published by the Harry Diamond Laboratories of Washington, D.C. Report No. 9, published Mar. 8, 1963, is entitled Logic Elements and was authored by E. V. Hobbs, and on pages 8, 21 and 22 there are shown and described half-adder devices which are monostable devices that can be adapted for use in the present invention. As taught in said article, device 15 includes an inlet channel 15a through which the stream of air flows from supply duct 11, a pair of outlet channels respectively designated 15b and 15c through which the air that enters inlet channel 15a selectively flows either to the room or zone to be air-conditioned or to return duct 12, and a pair of control channels respectively designated 15a and 15e by means of which the above-said stream of air can be controlled so as to selectively direct the air to one or the other of the outlet channels. Thus, inlet channel 15a connects with supply duct 11, outlet channel 15b connects with return duct 12, and outlet channel 15c connects with the duct or vent that leads directly to the room or zone to be air-conditioned. As previously stated, the rooms or zones, which are not specifically shown in the figure are thermostatically controlled. Accordingly, solenoid 16, which is mounted over the opening leading into control channel 15e, is connected by a line 16a to the thermostat in the associated room or zone.

In operation, monostable fluidic device 15 is biased so that the airstream will normally vent through outlet channel 15b, which means that the air entering inlet channel 15a from supply duct 11 will normally flow out through outlet channel 15b and into return duct 12. However, when the solenoid 16 is suitably activated by the thermostat connected thereto, the air stream flips to outlet channel 15c and will thereafter continue to vent from channel 15c so long as the solenoid remains in this activated condition. As will be recognized, when the air exits from outlet channel 15c, it goes to the room or zone being air-conditioned and from thence back to the return duct 12. Needless to say, when the solenoid is deactivated, the airstream, because the fluidic device is monostable, flips back to outlet channel 15b and once again flows directly to the return duct 12, thereby once again bypassing the room or zone. Finally, it should be mentioned that upon activation, the solenoid closes control channel 15e so that air, either ambient air or air from the main supply source, whichever is used, can no longer enter the fluidic device through this control channel, which creates the pressure imbalance that overcomes the designed bias of the device and causes the airstream to move to outlet channel 15c. When the solenoid is deactivated, control channel 15e is thereby again opened up so that the bias built into the device takes over and returns the airstream to its normal condition of flow.

It should also be noted that if apparatus 14 is a heating source, then the thermostat that control solenoid 16 will activate it when the temperature in the associated room or zone drops to the predetermined level. On the other hand, if apparatus 15 is a cooling source, then in that case the thermostat will activate the solenoid when the room or zone temperature rises to the predetermined level.

Figure 1B:
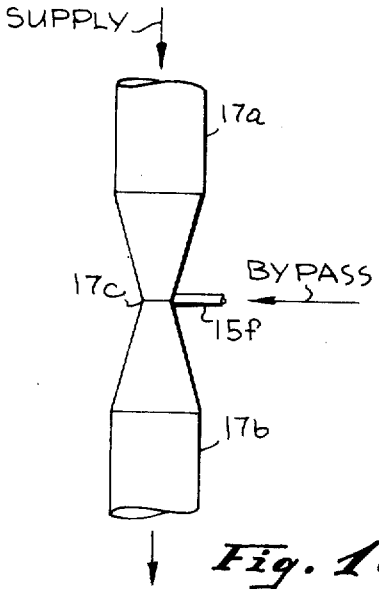
FIG. 1b is a drawing of a Venturi tube that may be employed in the FIG. 1a modification.
Figure 1A:
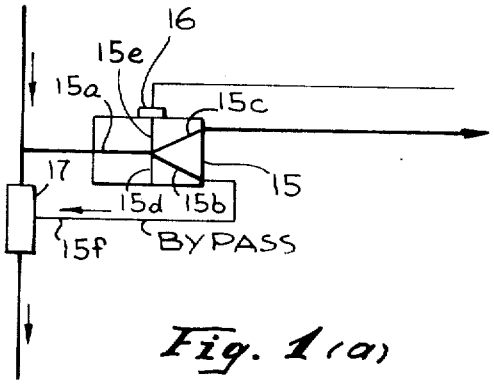
FIG. 1a is a schematic diagram illustrating a modification of the FIG. 1 system.

The system in FIG. 1 may be modified in the manner shown in FIG. 1a wherein only a portion of the FIG. 1 system is illustrated, namely, a portion involving one of the bypass valve arrangements 13. More specifically, the modification consists in connecting fluidic outlet channel 15b to supply duct 11 rather than to return duct 12 as was previously done, and this is made possible with the air of a Venturi tube 17 which is mounted in the supply line and also connected to outlet channel 15b. The configuration of a Venturi tube, whose parameters and characteristics are well known, is shown in FIG. 1b and includes an input or supply section 17a, an output or return section 17b, and a narrow neck or constricted section 17c therebetween. As may be seen from FIGS. 1a and 1b, Venturi tube sections 17a and 17b are connected in supply line 11, whereas constricted section 17c thereof connects, via bypass line 15f, to outlet channel 15b. The reason the Venturi tube is needed in this modification is because the pressure of the air out of channel 15b is lower than that in the supply line, with the result that the pressure in the supply line has to be lowered at some point in order to allow the air to reenter it. The Venturi tube does this, but any other mechanical device that accomplishes the same result may also be used.

Figure 2:
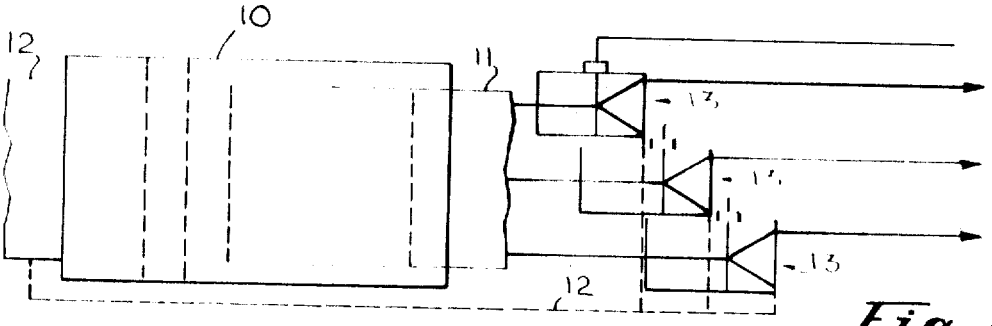
FIG. 2 is a schematic diagram that illustrates how zoning at an air handler may be obtained in an air-conditioning system according to the present invention.

The system in FIG. 1 may also be modified in the manner shown in FIG. 2 to which reference is now made. More particularly, in FIG. 1 the bypass valve arrangements 13 are mounted in the vicinity of the rooms or zones they respectively service, whereas in FIG. 2 the same bypass valve arrangements are mounted as a group in the vicinity of the air fan or handler 10. However, the operation of this system and the fluidic valves therein are the same, the advantage in the FIG. 2 arrangement lying in the fact that the length of the return line 12 is thereby greatly shortened. This is important because the air is bypassed during a major portion of the duty cycle and a substantially shorter return path correspondingly reduces the overall pressure drop around the system.

Figure 3:
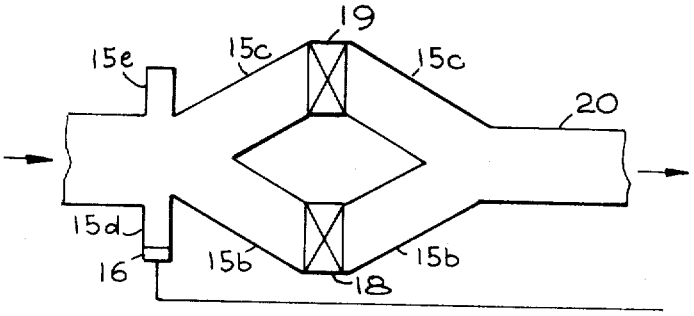
FIG. 3 illustrates how coils for heating and cooling air may be mounted in the output channels of a fluidic bypass valve.

The application of fluidic bypass valves to air-conditioning makes still other novel innovation possible of a highly advantageous nature, as illustrated in FIG. 3. More specifically, as is shown in FIG. 3, heating and cooling coils 18 and 19 may respectively be mounted in the two outlet channels 15b and 15c of a valve 15. By so doing and by also rejoining these two outlet channels at the input to the duct 20 leading to the conditioned space, rather simple and relatively inexpensive means are thereby provided for selectively heating and cooling each room or zone to be conditioned under the control of a thermostat. Thus, assuming that the airstream initially travels through outlet channel 15b and, therefore, that warm air initially enters the room or zone of interest, when the temperature reaches the preset upper level, the airstream is switched to outlet channel 15c in the manner and for the reasons previously described and explained. As a result, cool air now enters the conditioned area and this will continue until the temperature therein reaches the preset lower level, at which point the airstream once again flips to outlet channel 15b. Hence, under suitable thermostatic control, the airstream can be switched back and forth between the heating and cooling coils to respectively provide warm and cool air to the area being serviced. It will be recognized that very narrow temperature limits can be maintained with this kind of an arrangement so that, for all practical purposes, the temperature in a particular room or zone can be kept substantially steady or constant.

Figure 4:
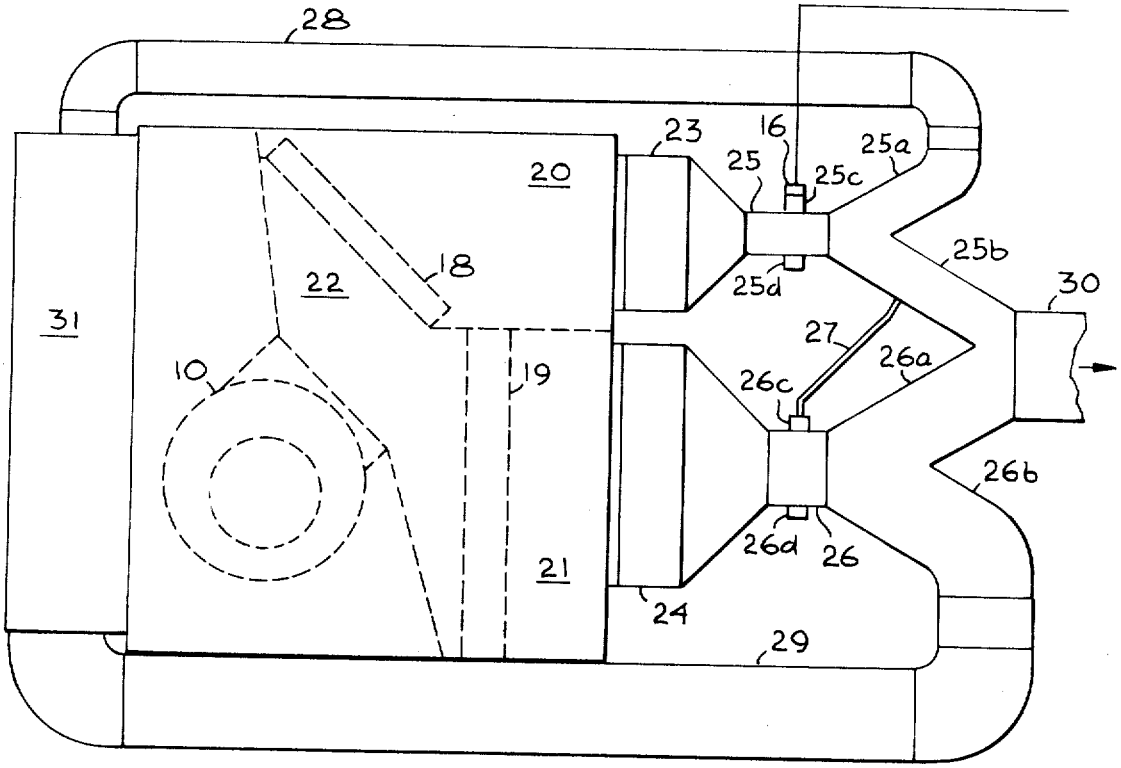
FIG. 4 is a schematic diagram showing how fluidic control valves may be substituted for dampers to provide a multizone air handler in an air-conditioning system according to the present invention.

The principles of FIGS. 1 and 3 may be combined in the manner shown in FIG. 4 to provide a fluidically controlled multizone air handler or, stated differently, an air handler unit in which one portion of the air is cooled, the fluidic valves in the unit determining, in response to a signal from the thermostat, which of the two portions is to be channeled to the conditioned space, the other portion automatically being returned by the valves to the return duct. For a better understanding of this new type of air handler unit, made possible by the application of fluidic bypass valves, attention is directed to FIG. 4 wherein the embodiment is shown to include the air fan 10, as well as the hot and cold coils 18 and 19 respectively mounted at the entrances to a pair of ducts designated 20 and 21. As may be seen from the figure, the space 22 between the fan and the coils is enclosed so that air from the fan will surely be directed to both coils simultaneously.

Ducts 20 and 21 respectively feed into another pair of ducts 23 and 24 which, in turn, respectively couple to the inlet channels of a pair of fluidic bypass valves 25 and 26. The two outlet channels for valve 25 are respectively designated 25a and 25b and its two control channels are respectively designated 25c and 25d. Similarly, the two outlet channels for valve 26 are respectively designated 26a and 26b, and its two control channels are respectively designated 26c and 26d. As may be seen from the figure, a thermostatically controlled solenoid 16 is mounted over control channel 25c and as before, this solenoid closes the opening leading into the control channel when activated by the thermostat to which it connects. Control channel 25d, on the other hand, vents either to the ambient air or to the main supply source, as does control channel 26d. Control channel 26c, however, is linked to outlet channel 25b by means of a feedback channel 27, and when air flows in outlet channel 25b a small portion of that air enters feedback channel 27 and passes through it to control channel 26c where, as a jet of air, it helps control the airflow in fluid device 26. With respect to the fluidic outlet channels, it will be noted that outlet channel 25a connects with a return duct 28 through which bypassed heated air passes, that outlet channel 26b connects with a return duct 29 through which bypassed air that has been cooled passes, and that outlet channels 25b and 26a both link with and feed into an air duct 30 that leads to the space to be conditioned. Fnally, the air handler unit includes a return plenum 31 with which the output ends of return ducts 28 and 29 link.

Considering now the operation of this air handler unit, it will be assumed that fluidic valve 25 is biased so that the heated airstream passing through it normally enters outlet channel 25b and from there into duct 30, and that the airstream is doing so initially. It will also be assumed that fluidic valve 26 is biased so that the cooled airstream passing therethrough normally enters into outlet channel 26a. However, with heated air exiting through outlet channel 25b, the cooled air flowing through valve 26 cannot pass through outlet channel 26a to duct 30 but is forced instead to enter and flow through outlet channel 26b to return duct 29, the reason being that a percentage of the airflow in outlet channel 25b enters feedback channel 27 to form a control jet that passes through control channel 26c to impinge against the cooled airstream in valve 26. This control jet overcomes the bias of the valve and, therefore, forces the airstream therein to flow through outlet channel 26b instead. Thus, when heated air flows into duct 30, the cooled air is bypassed by valve 26 and flows instead into return plenum 31.

When solenoid 16 is activated by its associated thermostatic control, however, the stream of heated air is switched from outlet channel 25b to outlet channel 25a and it continues to flow out of channel 25a and through return duct 28 and return plenum 31 so long as the solenoid remains activated. As a result, the control jet that was formerly applied to the airstream in fluidic valve 26 ceases and when it does, the built-in bias of this valve causes the stream therein to likewise switch from outlet channel 26b to outlet channel 26a, with the result that the cooled air now enters duct 30 instead of the heated air. It should be mentioned that both switching actions occur substantially simultaneously.

Needless to say, when as a result of temperature changes in the conditioned space, the solenoid 16 is deactivated, the heated airstream once again returns to outlet channel 25b and, simultaneously therewith, the cooled airstream returns to outlet channel 26b. Thus, when the signal from the thermostat is removed from the solenoid, the operation returns to its normal condition which is the pattern initially described.

The arrangements described in connection with FIGS. 1 and 2 are for air-conditioning systems adapted in accordance with the present invention to supply either heating or cooling to a zone, but not both. On the other hand, FIGS. 3 and 4 illustrate air-conditioning systems which, in accordance with the invention, do supply both heating and cooling as needed. In these latter two instances, however, the fluidic valves are not being used to their best advantage.

For example, in the FIG. 3 embodiment, heating and cooling coils are respectively mounted in the two outlet channels of the valve which, although effective, is not an optimum arrangement. The same is true for the FIG. 4 embodiment wherein heating and cooling is provided by intercoupling a pair of fluidic valves in parallel. Accordingly, another and preferred embodiment is illustrated in FIG. 5 in which two fluidic devices are connected in series, common outlet and bypass connections being provided for them.

Figure 5:
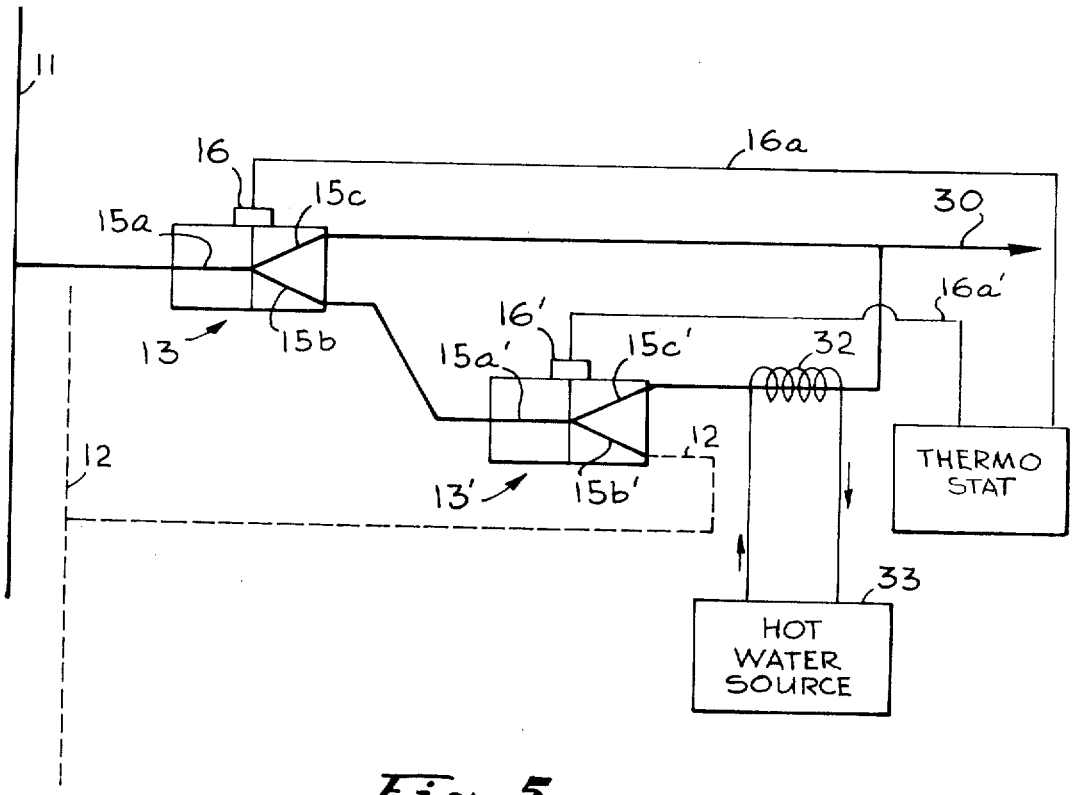
FIG. 5 is a schematic diagram illustrating how two fluidic valves may be connected is series to provide selective heating and cooling control in room air-conditioning systems.

More specifically, referring to FIG. 5, two fluidic valves of the kind previously identified and described herein, designated 13 and 13', are connected in series, by which is meant that outlet channel 15b of valve 13 is connected directly to inlet channel 15a of valve 13'. As for inlet channel 15a of valve 13, this is connected, as before, to supply duct 11. As for outlet channel 15c of valve 13, and outlet channels 15b' and 15c' of valve 13', channels 15c and 15c' are connected to and, therefore, feed into output duct 30, whereas outlet channel 15b' is connected directly to bypass and return duct 12. As before and in the manner previously mentioned, valves 13 and 13' are respectively controlled by a pair of solenoids 16 and 16', solenoids 16 and 16' being operated by distant thermostats to which they are connected by means of wires 16a and 16a'. Finally, a hot water heating coil 32 is wound around outlet channel 15c' or the extension thereof, the hot water continuously circulating through the heating coil being supplied from the building's portable water system designated 33 in the figure.

In operation, since both valves are monostable in design, the air normally flows from supply duct 11 through inlet 15a, and from thence through outlet channel 15b to valve 13'. In valve 13', the air similarly flows through inlet channel 15a' and then through outlet channel 15b' back to bypass and return duct 12. However, if the zone or room being conditioned by this system needs to be cooled, then the thermostat (not shown) operates solenoid 16 which, in turn, and for the reasons previously given, causes the airflow to be diverted from outlet channel 15b to outlet channel 15c, with the result that the cooling air, instead of being bypassed, is now fed into duct 30 which leads to the aforesaid zone or room. On the other hand, if the zone or room needs to be heated rather than cooled, then solenoid 16' is activated by the thermostat, which has the effect of diverting the flow from outlet channel 15b' to outlet channel 15c'. When this occurs, the air is heated as it passes through coil 32 on its way to duct 30. Needless to say, after an appropriate amount of either cooling or heating, whichever is needed, the air flow is once again returned to normal, that is to say, channel-led to bypass and return duct 12.

Thus, it can be seen that the FIG. 5 arrangement provides very effective heating and cooling control in room air-conditioning systems. With the room thermostat satisfied, all air is returned to the bypass. On a call for cooling, the air supply is delivered to the conditioned space. On the other hand, on a call for heating, the air is first diverted through the hot water heating coil before being delivered to the conditioned space.

Figure 6:
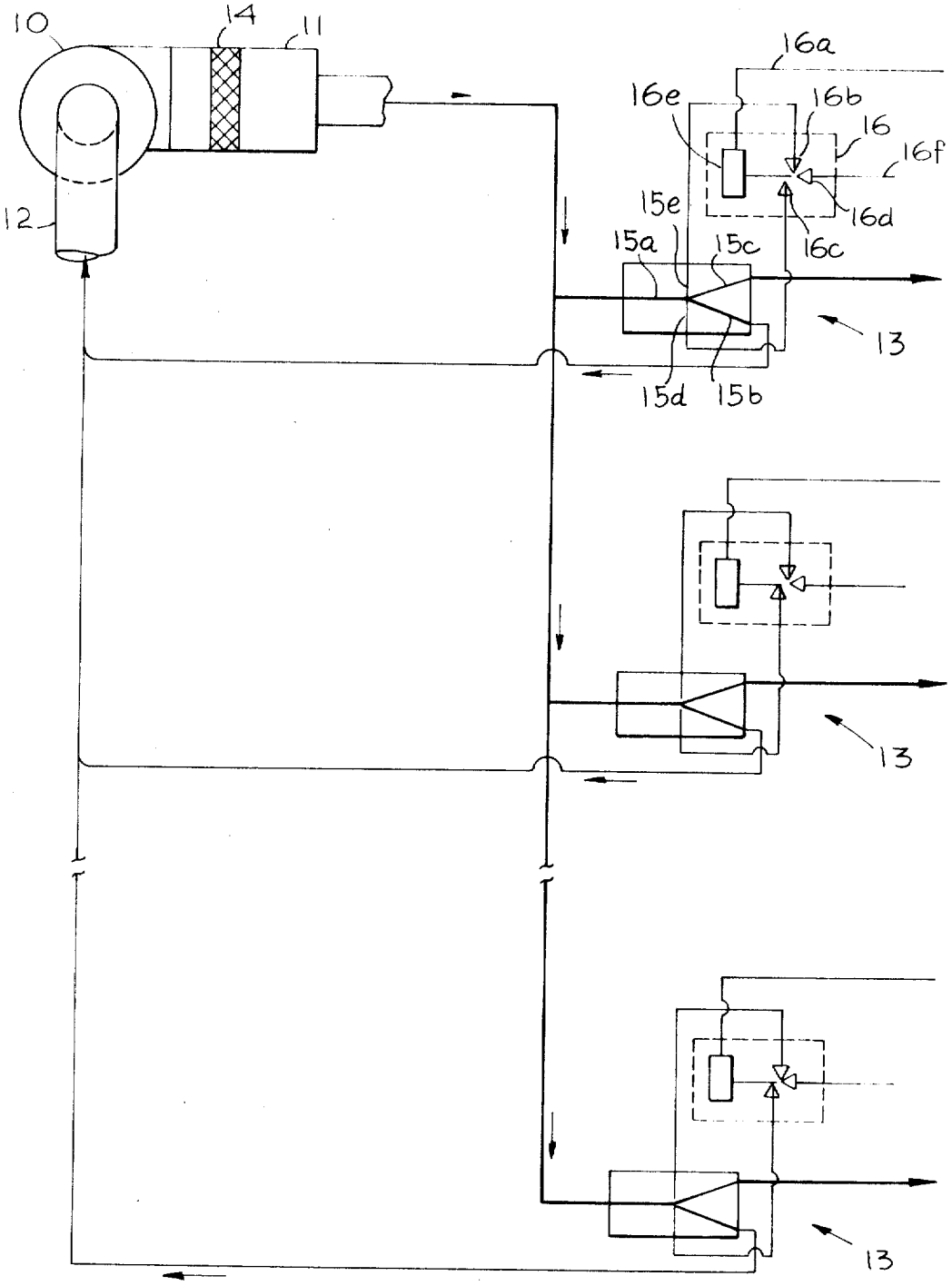
FIG. 6 is a repeat of a portion of the FIG. 1 air-conditioning system, but showing the applicability and use of bistable type fluidic valves therein instead of the monostable kind.

As was previously mentioned, indeed emphasized, a bistable type or fluid amplifier device can be used just as well as the monostable type, and this fact is illustrated in FIG. 6 to which reference is now made, the FIG. 6 system being identical to the FIG. 1 system with but two exceptions, namely, that fluidic device 15 in FIG. 6 is of the bistable kind and that a three-way valve 16 has been substituted for the solenoid. All the rest remains the same, as can clearly be seen from a comparison of FIGS. 1 and 6.

Three-way valve 16 comprises three valve elements respectively designated 16b, 16c and 16d, as well as a drive element 16e for operating the valve elements in response to some signal applied thereto. In this regard, the type of signal would to some extent depend on the particular manufacture of the three-way valve, which may, by way of example, be a solenoid valve, a pneumatic valve, or a motor driven valve. Since solenoids have heretofore been utilized in describing the invention, it is deemed worthwhile, for sake of clariy and expediency, that valve 16 be considered to be a solenoid type of three-way valve, but it will, of course, be understood that embodiments of the invention are not limited thereto. Erie Valve and Minneapolis Honeywell are two companies that manufacture such valves which are available in the commercial marketplace.

Considering the FIG. 6 arrangement in somewhat greater detail, valve elements 16b and 16c are respectively connected to control channels 15e and 15d, valve element 16d, on the other hand, being connected or coupled to the ambient air or the main air supply source which is represented in the figure by the line 16f. Drive element 16e is connected via line 16a to the thermostatic control in the associated room or zone to be conditioned, and is also coupled to valve elements 16b and 16c which are simultaneously operated by it. More particularly, when driven in one direction by element 16e, valve 16b opens and thereby exposes control channel 15e either to ambient or supplied air and, simultaneously therewith, valve 16c closes and thereby closes off control channel 15d to deprive it of air. On the other hand, when driven in the other direction by element 16c, valve 16b closes and valve 16c opens, thereby respectively shutting off and exposing control channels 15e and 15d from and to the air source used. As previously mentioned, the air is delivered to valve 16d and thereafter enters and passes through either valve 16b and 16c depending on which is open at the time.

Considering the operation of the FIG. 6 arrangement more fully, if the airstream is initially venting through outlet channel 15b and thereby going directly to the return duct, as it will be assumed it is initially doing, this corresponds to the situation where valve 16c and, therefore, control channel 15d are closed and valve 16b and control channel 15e are open. Now, if the temperature conditions in the room or zone to be conditioned warrant it, a signal from the thermostat therein is applied to drive element 16e and, in response thereto, valves 16b and 16c are respectively closed and opened and this, in turn, respectively closes and opens control channels 15e and 15d. As a result, the airstream quickly switches or flips to outlet channel 15c from which it is delivered to the associated room or zone. As will be recognized by those skilled in the art, the airstream continues to vent through channel 15c until another signal is received from the thermostat by drive element 16e and this will occur when the room or zone has been conditioned as described. It should be mentioned, however, that when the signal is received, valves 16b and 16c return to their initial condition as assumed above, with the result that the airstream switches to and once again flows through outlet channel 15b to the return duct. This later flow will continue until a further signal is produced by the thermostat and applied to the drive element, as explained above.

As will be recognized by those skilled in the art, the use of a bistable rather than a monostable fluid amplifier device will not prevent or affect the modifications shown in FIGS. 1a, 1b and 2 through 5. Accordingly, all of the modifications shown in these figures and described in connection therewith can also be made when bistable devices are employed in the system.

Although a number of particular arrangements of the invention have been illustrated and described above by way of example, it is not intended that the invention be limited thereto. Accordingly, the invention should be considered to include any and all modifications, alterations or equivalent arrangements falling within the scope of the annexed claims.

Having thus described the invention, I claim:

1. In a system that provides air-conditioning for a plurality of rooms, the system[,] including means for producing a stream of air under pressure, a supply duct for channeling the air from said means to the vicinity of the rooms, and a return duct for channeling the stream of air back to said means, equipment mounted outside said rooms and between them and said supply and return ducts, said equipment comprising: a plurality of pure fluid amplifier arrangements, corresponding in number to the number of rooms, mounted between the supply duct and the rooms, one such arrangement being mounted between the supply duct and each room, each of said amplifier arrangements including at least an inlet channel coupled to the supply duct and into which a portion of the airstream flows, a pair of outlet channels, only one of said outlet channels being coupled to the room to deliver said airstream to the space therein, and a pair of control channels through which air pressures are selectively directed against said airstream to switch the stream from one of said outlet channels to the other; a plurality of mechanisms corresponding in number to the number of fluid amplifier arrangements and coupled to a source of air pressure, one mechanism coupled to the pair of control channels in each such fluid amplifier arrangement, each mechanism being operable in response to an appropriate signal applied thereto to cause air pressure to be applied to a selected one of its associated control channels; and thermostatic apparatus mounted in each of the rooms to apply an appropriate signal to the associated mechanism when the temperature in the room reaches a predetermined level.

2. The equipment defined in claim 1 wherein the other of said outlet channel in each of said fluid amplifier arrangements leads directly to the return duct to bypass the rooms, the stream of air flowing through any of said other outlet channels bypassing the associated room.

3. The equipment defined in claim 1 wherein in each fluid amplifier arrangement both outlet channels of said pair of outlet channels are coupled to the room, and wherein the equipment further includes heating and cooling elements respectively coupled to said pair of outlet channels for selectively heating and cooling air passing therethrough.

4. The equipment defined in claim 2 wherein each of said fluid amplifier arrangements is of the monostable type and biased in its construction so that the airstream flowing therethrough normally exits through the outlet channel leading directly to the return duct.

5. The equipment defined in claim 2 wherein each of said fluid amplifier arrangements is of the bistable type, the outlet channel thereof through which the airstream flows being selected under the control of the thermostatic apparatus.

6. The equipment defined in claim 2 wherein said equipment further includes a plurality of pressure-equalizing elements, corresponding in number to the number of fluid amplifier arrangements, that are mounted in the supply duct, the outlet channels of said fluid amplifier arrangements that bypass their rooms respectively being connected to said pressure-equalizing elements.

7. The equipment defined in claim 4 wherein each of said mechanisms is a solenoid mounted over one of the control channels in its associated amplifier arrangement and operable in response to an appropriate signal applied thereto to close said one control channel, the flow of the airstream in said amplifier arrangement being switched from the outlet channel bypassing the associated room to the outlet channel coupled to it.

8. The equipment defined in claim 5 wherein each of said mechanisms is a three-way valve device including a drive element, one of said valves being coupled to receive air pressure and the remaining two valves respectively being coupled to the pair of control channels in the associated bistable fluid amplifier arrangement, said two valves selectively closing one control channel to said air pressure and simultaneously opening the other channel to said air pressure in response to an appropriate signal applied to said drive element, thereby to switch the airstream from one outlet channel to the other.

9. The equipment defined in claim 6 wherein said pressure-equalizing elements are Venturi tubes, the connections between said Venturi tubes and the outlet channels bypassing their rooms respectively being at the narrow necks of said tubes.

10. An air-conditioning system for a plurality of rooms, said system comprising: means for producing a stream of conditioned air under pressure; a supply duct for channeling the airstream from said means to the vicinity of said rooms; a return duct external to said rooms for channeling the stream of air back to said means; equipment external to said rooms and coupled thereto as well as said supply and return ducts, said equipment normally channeling the airstream from the supply duct directly to the return duct and operable in response to a signal received from a room to divert a portion of said airstream from said supply duct to said room, said equipment including a plurality of pure fluid amplifier devices for channeling said airstream to said return duct and for diverting portions thereof to selected rooms in response to signals therefrom; and a plurality of thermostatic control devices respectively mounted in said plurality of rooms for producing said signals therefrom when the temperatures in the rooms respectively reach predetermined levels.

11. The system defined in claim 10 wherein said pure fluid amplifier devices are of the monostable type with each including an inlet channel connected to the supply duct, a pair of outlet channels respectively connected to a room and the return duct, and a pair of control channels coupled to opposite sides of the airstream flowing in said amplifier device, said monostable amplifier devices being biased in their construction to normally direct the flow of the airstream therein to the outlet channels connected to the return duct; and wherein each of said pure fluid amplifier devices further includes a mechanism that is activated in response to signals applied thereto to selectively open and close one of said control channels, said one control channel being such that during activation of said mechanism the airstream flowing in said device is switched from the outlet channel leading to the return duct to the outlet channel leading to the room.

12. The system defined in claim 10 wherein said pure fluid amplifier devices are of the bistable type with each including an inlet channel connected to the supply duct, a pair of outlet channels respectively connected to a room and the return duct, and a pair of control channels coupled to opposite sides of the airstream flowing in said amplifier device; and wherein each of said pure fluid amplifier devices further includes a mechanism coupled to said pair of control channels for alternately switching the airstream flowing in said device from one of its outlet channels to the other in response to signals successively applied thereto.

References Cited

The following references, cited by the Examiner, are of record in the patented file of this patent or the original patent.

UNITED STATES PATENTS

| | | | |
|---|---|---|---|
| 3,275,014 | 9/1966 | Plasko | 137—81.5 |
| 3,426,782 | 2/1969 | Thurburn | 165—26 |

CHARLES SUKALO, Primary Examiner

U.S. Cl. X.R.

165—50; 137—81.5